US010798143B2

(12) United States Patent
Soroushian et al.

(10) Patent No.: US 10,798,143 B2
(45) Date of Patent: Oct. 6, 2020

(54) SELECTION OF RESOLUTIONS FOR SEAMLESS RESOLUTION SWITCHING OF MULTIMEDIA CONTENT

(71) Applicant: DIVX, LLC, San Diego, CA (US)

(72) Inventors: Kourosh Soroushian, San Diego, CA (US); Abhishek Shivadas, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 536 days.

(21) Appl. No.: 15/287,608

(22) Filed: Oct. 6, 2016

(65) Prior Publication Data

US 2017/0026445 A1    Jan. 26, 2017

Related U.S. Application Data

(63) Continuation of application No. 13/430,032, filed on Mar. 26, 2012, now Pat. No. 9,467,708.
(Continued)

(51) Int. Cl.
*H04L 29/06* (2006.01)
*H04N 21/2343* (2011.01)
(Continued)

(52) U.S. Cl.
CPC ........ *H04L 65/607* (2013.01); *H04L 65/4069* (2013.01); *H04N 19/33* (2014.11);
(Continued)

(58) Field of Classification Search
USPC ......................................................... 386/232
See application file for complete search history.

(56) References Cited

U.S. PATENT DOCUMENTS 3,919,474 A    11/1975 Benson
4,974,260 A    11/1990 Rudak
(Continued)

FOREIGN PATENT DOCUMENTS

CN    1662952 A    8/2005
CN    1756359 A    4/2006
(Continued)

OTHER PUBLICATIONS

International Preliminary Report on Patentability for International Application No. PCT/US2012/053223, Report Issued Mar. 4, 2014, 7 pgs.
(Continued)

*Primary Examiner* — Loi H Tran
(74) *Attorney, Agent, or Firm* — KPPB LLP

(57) ABSTRACT

Systems and methods for the selection of resolutions for seamless resolution switching of multimedia content in accordance with embodiments of the invention are disclosed. In one embodiment of the invention, a source encoder includes a processor configured by a source encoder application to receive multimedia content, where the multimedia content comprises video data having a primary resolution and a primary sample aspect ratio and encode the video data as a set of alternative streams, where a plurality of the streams in the set of alternative streams have different maximum bitrates and resolutions, the resolution of each of the plurality of streams comprises a width and height that are both an integer number of pixels, and both the width and height of each of the plurality of streams is a common fraction of the width and height of the corresponding primary resolution.

12 Claims, 7 Drawing Sheets

Related U.S. Application Data

(60) Provisional application No. 61/529,216, filed on Aug. 30, 2011.

(51) Int. Cl.
*H04N 19/33* (2014.01)
*H04N 21/845* (2011.01)

(52) U.S. Cl.
CPC ............... *H04N 21/23439* (2013.01); *H04N 21/234363* (2013.01); *H04N 21/8456* (2013.01)

(56) References Cited

U.S. PATENT DOCUMENTS

| | | | |
|---|---|---|---|
| 5,912,710 | A | 6/1999 | Fujimoto |
| 6,005,621 | A * | 12/1999 | Linzer .................... H04N 19/51 375/240.11 |
| 6,157,410 | A | 12/2000 | Izumi et al. |
| 6,430,354 | B1 | 8/2002 | Watanabe |
| 6,920,179 | B1 | 7/2005 | Anand et al. |
| 8,818,171 | B2 | 8/2014 | Soroushian et al. |
| 9,467,708 | B2 | 10/2016 | Soroushian et al. |
| 9,510,031 | B2 | 11/2016 | Soroushian et al. |
| 9,955,195 | B2 | 4/2018 | Soroushian |
| 2003/0142872 | A1 * | 7/2003 | Koyanagi ...... H04N 21/234327 382/236 |
| 2004/0150747 | A1 | 8/2004 | Sita |
| 2004/0208245 | A1 | 10/2004 | Macinnis et al. |
| 2005/0052294 | A1 | 3/2005 | Liang et al. |
| 2005/0089091 | A1 | 4/2005 | Zhao et al. |
| 2005/0157948 | A1 | 7/2005 | Lee |
| 2005/0210145 | A1 | 9/2005 | Kim et al. |
| 2006/0015813 | A1 * | 1/2006 | Chung .................. G06F 17/214 715/201 |
| 2006/0039481 | A1 | 2/2006 | Shen |
| 2006/0126717 | A1 | 6/2006 | Boyce et al. |
| 2007/0024706 | A1 * | 2/2007 | Brannon, Jr. ...... H04N 7/17318 348/142 |
| 2007/0053293 | A1 | 3/2007 | Mcdonald et al. |
| 2008/0030614 | A1 | 2/2008 | Schwab |
| 2008/0052306 | A1 | 2/2008 | Wang et al. |
| 2008/0137848 | A1 | 6/2008 | Kocher et al. |
| 2008/0196076 | A1 | 8/2008 | Shatz et al. |
| 2008/0253454 | A1 | 10/2008 | Imamura et al. |
| 2008/0266522 | A1 | 10/2008 | Weisgerber |
| 2009/0116821 | A1 | 5/2009 | Shibamiya et al. |
| 2009/0300204 | A1 | 12/2009 | Zhang et al. |
| 2010/0002069 | A1 | 1/2010 | Eleftheriadis et al. |
| 2010/0262712 | A1 | 10/2010 | Kim et al. |
| 2010/0278271 | A1 | 11/2010 | MacInnis |
| 2011/0022432 | A1 | 1/2011 | Ishida et al. |
| 2011/0082924 | A1 | 4/2011 | Gopalakrishnan |
| 2011/0099594 | A1 | 4/2011 | Chen et al. |
| 2011/0126104 | A1 | 5/2011 | Woods et al. |
| 2011/0164679 | A1 | 7/2011 | Satou et al. |
| 2011/0170408 | A1 | 7/2011 | Furbeck et al. |
| 2011/0280307 | A1 | 11/2011 | MacInnis |
| 2012/0173751 | A1 | 7/2012 | Braness et al. |
| 2012/0177101 | A1 | 7/2012 | van der Schaar |
| 2012/0179834 | A1 | 7/2012 | van der Schaar et al. |
| 2012/0281767 | A1 | 11/2012 | Duenas et al. |
| 2013/0051767 | A1 | 2/2013 | Soroushian et al. |
| 2013/0051768 | A1 | 2/2013 | Soroushian et al. |
| 2013/0058393 | A1 | 3/2013 | Soroushian |
| 2013/0169863 | A1 | 7/2013 | Smith |
| 2014/0355958 | A1 | 12/2014 | Soroushian et al. |
| 2017/0041604 | A1 | 2/2017 | Soroushian et al. |
| 2018/0278975 | A1 | 9/2018 | Soroushian |

FOREIGN PATENT DOCUMENTS

| | | |
|---|---|---|
| CN | 1787422 A | 6/2006 |
| CN | 101461149 A | 6/2009 |
| CN | 102138327 A | 7/2011 |
| CN | 103858419 A | 6/2014 |
| CN | 103875248 A | 6/2014 |
| CN | 103875248 B | 9/2018 |
| CN | 108989847 A | 12/2018 |
| EP | 1335603 A2 | 8/2003 |
| HK | 1195183 B | 2/2018 |
| HK | 1260329 A | 12/2019 |
| JP | 2009508452 A | 2/2009 |
| KR | 20140056317 A | 5/2014 |
| KR | 101928910 B1 | 12/2018 |
| KR | 10-1936142 B1 | 1/2019 |
| KR | 10-1981923 B1 | 5/2019 |
| KR | 10-2020764 B1 | 9/2019 |
| KR | 10-2074148 B1 | 1/2020 |
| KR | 10-2086995 B1 | 3/2020 |
| WO | 2010150470 A1 | 12/2010 |
| WO | 2011053658 A1 | 5/2011 |
| WO | 2011059291 A2 | 5/2011 |
| WO | 2011087449 A1 | 7/2011 |
| WO | 2011093835 A1 | 8/2011 |
| WO | 2011102791 A1 | 8/2011 |
| WO | 2013033334 A1 | 3/2013 |
| WO | 2013033335 A1 | 3/2013 |
| WO | 2013033458 A2 | 3/2013 |
| WO | 2013033458 A3 | 5/2013 |

OTHER PUBLICATIONS

International Search Report and Written Opinion for International Application No. PCT/US2012/053052, International Filing Date Aug. 30, 2012, Report Completed Oct. 25, 2012, dated Nov. 16, 2012, 9 pgs.

International Search Report and Written Opinion for International Application No. PCT/US2012/053223, International Filing Date Aug. 30, 2012, Report Completed Dec. 7, 2012, dated Mar. 7, 2013, 10 pgs.

International Search Report and Written Opinion for International Application PCT/US2012/053053, dated Oct. 23, 2012, 11 pgs.

International Search Report for International Application No. PCT/SE2011/050166, Search completed Mar. 3, 2011, dated Mar. 3, 2011, 5 Pgs.

Extended European Search Report for European Application EP12828956.8,Report Completed Feb. 18, 2015, dated Mar. 2, 2015, 13 Pgs.

"Adaptive HTTP Streaming in PSS—Client Behaviour", S4-AHI129, 3GPP TSG-SA4 Ad-Hoc Meeting, Dec. 14-16, 2009, Paris, France; section 12.6.1.

"Adaptive HTTP Streaming in PSS—Data Formats for HTTP—Streaming excluding MPD", S4-AHI128, 3GPP TSGSA4 Ad-Hoc Meeting, Dec. 14-16, 2009, Paris, France; sections 12.2.1 and 12.2.4.2.1.

"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19.

"Fragmented Time Indexing of Representations", S4-AHI126, 3GPP TSG-SA4 Ad-Hoc Meeting, Dec. 14-16, 2009, Paris, France.

"Transparent end-to-end packet switched streaming service (PSS); 3GPP file format (3GP) (Release 9)", 3GPP TS 26.244 V9.0.0 (Dec. 2009),sections 7.1-7.4.

Fecheyr-Lippens, A., "A Review of HTTP Live Streaming", Jan. 25, 2010, X P002638990, Retrieved from the Internet: URL:http://issuu.com/andruby/docs/http_live_streaming Retrieved on May 24, 2011, 38 Pages.

Watson, Mark, "Input for Dash EE#1 (CMP): Pixel Aspect Ratio", 94. MPEG Meeting, Oct. 11-15, 2010, Guangzhou, Motion Picture Expert Group or ISO/IEC JTC1/SC29/WG11, No. M18498, Oct. 28, 2010, XP030047088, 4 Pages.

International Preliminary Report on Patentability for International Application No. PCT/US2012/053052, dated Mar. 4, 2014, 8 pgs.

* cited by examiner

500

Primary Resolution of 1920x1080

| Width | Height | Width Ratio | Height Ratio |
|---|---|---|---|
| 512 | 288 | 4/15 | 4/15 |
| 640 | 360 | 1/3 | 1/3 |
| 768 | 432 | 2/5 | 2/5 |
| 896 | 504 | 7/15 | 7/15 |
| 1024 | 576 | 8/15 | 8/15 |
| 1152 | 648 | 3/5 | 3/5 |
| 1280 | 720 | 2/3 | 2/3 |
| 1408 | 792 | 11/15 | 11/15 |
| 1536 | 864 | 4/5 | 4/5 |
| 1664 | 936 | 13/15 | 13/15 |
| 1792 | 1008 | 14/15 | 14/15 |
| 1848 | 1040 | 77/80 | 26/27 |
| 1920 | 1080 | 1/1 | 1/1 |

FIG. 5

| 16:9 Aspect Ratio | | | 1.85:1 Aspect Ratio | | | 2.35:1 Aspect Ratio | | | 2.4:1 Aspect Ratio | | |
|---|---|---|---|---|---|---|---|---|---|---|---|
| Width | Height | % Max Res | Width | Height | % Max Res | Width | Height | % Max Res | Width | Height | % Max Res |
| 512 | 288 | 7.1 | 560 | 304 | 8.5 | 640 | 272 | 11.1 | 576 | 240 | 9 |
| 640 | 360 | 11.1 | 576 | 312 | 9 | 864 | 368 | 20.3 | 672 | 280 | 12.1 |
| 768 | 432 | 16 | 680 | 368 | 12.5 | 960 | 408 | 25 | 768 | 320 | 16 |
| 896 | 504 | 21.8 | 768 | 416 | 16 | 1128 | 480 | 34.6 | 864 | 360 | 20.2 |
| 1024 | 576 | 28.4 | 960 | 520 | 25 | 1184 | 504 | 38.1 | 920 | 384 | 23 |
| 1152 | 648 | 36 | 1152 | 624 | 36 | 1280 | 544 | 44.4 | 960 | 400 | 25 |
| 1280 | 720 | 44.4 | 1240 | 672 | 41.7 | 1392 | 592 | 52.6 | 1056 | 440 | 30.3 |
| 1408 | 792 | 53.8 | 1344 | 728 | 49 | 1504 | 640 | 61.4 | 1152 | 480 | 36 |
| 1536 | 864 | 64 | 1536 | 832 | 64 | 1600 | 680 | 69.4 | 1248 | 520 | 42.3 |
| 1664 | 936 | 75.1 | 1728 | 936 | 81 | 1656 | 704 | 74.4 | 1344 | 560 | 49 |
| 1792 | 1008 | 87.1 | 1920 | 1040 | 100 | 1920 | 816 | 100 | 1400 | 584 | 53.2 |
| 1848 | 1040 | 92.7 | | | | | | | 1440 | 600 | 56.2 |
| 1920 | 1080 | 100 | | | | | | | 1536 | 640 | 64 |
| | | | | | | | | | 1632 | 680 | 72.2 |
| | | | | | | | | | 1728 | 720 | 81 |
| | | | | | | | | | 1824 | 760 | 90.2 |
| | | | | | | | | | 1880 | 784 | 96 |
| | | | | | | | | | 1920 | 800 | 100 |

*FIG. 6*

| WidthRatio*HeightRatio | Occurrences | Corresponding Width | Height @ 16:9 | Height @ 1.85:1 | Height @ 2.35:1 | Height @ 2.4:1 |
|---|---|---|---|---|---|---|
| 100% | 4 | 1920 | 1080 | 1040 | 816 | 800 |
| 64% | 3 | 1536 | 864 | 832 | 656 | 640 |
| 36% | 3 | 1152 | 648 | 624 | 488 | 480 |
| 25% | 3 | 960 | 544 | 520 | 408 | 400 |
| 16% | 3 | 768 | 432 | 416 | 328 | 320 |

SELECTION OF RESOLUTIONS FOR SEAMLESS RESOLUTION SWITCHING OF MULTIMEDIA CONTENT

CROSS-REFERENCE TO RELATED APPLICATIONS

The current application is a continuation of U.S. application Ser. No. 13/430,032, filed Mar. 26, 2012, which application claims priority to U.S. Provisional Patent Application No. 61/529,216, filed Aug. 30, 2011, the disclosures of which are incorporated herein by reference in their entirety.

FIELD OF THE INVENTION

The present invention relates to the delivery of multimedia content and more specifically to streaming video content encoded at multiple resolutions optimized for a variety of scaled display resolutions.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods for the selection of resolutions for seamless resolution switching of multimedia content in accordance with embodiments of the invention are disclosed. In one embodiment of the invention, a source encoder includes a processor configured by a source encoder application to receive multimedia content, where the multimedia content comprises video data having a primary resolution and a primary sample aspect ratio and encode the video data as a set of alternative streams, where a plurality of the streams in the set of alternative streams have different maximum bitrates and resolutions, the resolution of each of the plurality of streams comprises a width and height that are both an integer number of pixels, and both the width and height of each of the plurality of streams is a common fraction of the width and height of the corresponding primary resolution.

In an additional embodiment of the invention, a plurality of the streams in the set of alternative streams has the same aspect ratio and different maximum bitrates and resolutions.

In still another embodiment of the invention, a plurality of the streams in the set of alternative streams has the same aspect ratio and different maximum bitrates, sample aspect ratios and resolutions.

In still another embodiment of the invention, the primary resolution is 1920×1080, and the primary aspect ratio is 16:9 and a plurality of the streams in the set of alternative streams are encoded with the following resolution, and sample aspect ratios:
  Resolution=1536×864; Sample Aspect Ratio=1:1
  Resolution=1152×648; Sample Aspect Ratio=1:1
  Resolution=960×544; Sample Aspect Ratio=1:1
  Resolution=768×432; Sample Aspect Ratio=1:1

In yet still another embodiment of the invention, the primary resolution is 1920×1040, and the primary aspect ratio is 1.85:1 and a plurality of the streams in the set of alternative streams are encoded with the following resolution, and sample aspect ratios:
  Resolution=1536×832; Sample Aspect Ratio=1:1
  Resolution=1152×624; Sample Aspect Ratio=1:1
  Resolution=960×520; Sample Aspect Ratio=1:1
  Resolution=768×416; Sample Aspect Ratio=1:1

In yet another additional embodiment of the invention, wherein the primary resolution is 1920×816, and the primary aspect ratio is 2.35:1 and a plurality of the streams in the set of alternative streams are encoded with the following resolution, and sample aspect ratios:
  Resolution=1536×656; Sample Aspect Ratio=1:1
  Resolution=1152×488; Sample Aspect Ratio=1:1
  Resolution=960×408; Sample Aspect Ratio=1:1
  Resolution=768×328; Sample Aspect Ratio=1:1

In still another additional embodiment of the invention, the primary resolution is 1920×800, and the primary aspect ratio is 2.40:1 and a plurality of the streams in the set of alternative streams are encoded with the following resolution, and sample aspect ratios:
  Resolution=1536×640; Sample Aspect Ratio=1:1
  Resolution=1152×480; Sample Aspect Ratio=1:1
  Resolution=960×400; Sample Aspect Ratio=1:1
  Resolution=768×320; Sample Aspect Ratio=1:1

Still another embodiment of the invention includes encoding multimedia content comprising video data having a primary resolution and a primary sample aspect ratio as a plurality of alternative streams including receiving multimedia content comprising video data having a primary resolution and a primary sample aspect ratio using a source encoder and encoding the video data as a set of alternative streams using a source encoder, where a plurality of the streams in the set of alternative streams have different maximum bitrates and resolutions, wherein the resolution of each of the plurality of streams comprises a width and height that are both an integer number of pixels and both the width and height of each of the plurality of streams is a common fraction of the width and height of the corresponding primary resolution.

In yet another embodiment of the invention, the numerator and denominator of the fraction are each less than 100.

Still another embodiment of the invention includes a playback device which includes a processor configured to communicate with a memory, where the memory contains a client application, wherein the client application configures the processor to obtain an index file, where the index file describes a plurality of alternative video streams having the same aspect ratio and different bitrates, resolutions and at least two of the plurality of alternative video streams have different sample aspect ratios, configure a video decoder to decode video having a resolution, and sample aspect ratio of a first of the plurality of alternative video streams, where decoding the video comprises scaling the decoded video to the resolution of the display device, and request a portion of the first stream.

Still another embodiment of the invention includes playing back content including obtaining an index file using a playback device, where the index file describes a plurality of alternative video streams having the same aspect ratio and different bitrates, resolutions and at least two of the plurality of alternative video streams have different sample aspect ratios, configuring a video decoder on the playback device to decode video having a resolution, and sample aspect ratio of a first of the plurality of alternative video streams, where decoding the video comprises scaling the decoded video to the resolution of the display device, and requesting a portion of the first stream using the playback device.

Still another embodiment of the invention includes determining a set of sub-resolutions for encoding a primary video stream having a primary resolution, and primary aspect ratio as a set of lower resolution streams including selecting a set of sub-resolutions, where the height and width of each sub-resolution in the set of sub-resolutions is an integer number of pixels and less than the corresponding width and height of the primary resolution and selecting sub-resolutions from the set of sub-resolutions, where the width and height of the selected sub-resolutions have the same aspect ratio as the primary aspect ratio.

In yet another additional embodiment of the invention, the width and height for each sub-resolution in the set of sub-resolutions is a multiple of 8.

In still another additional embodiment of the invention, the set of sub-resolutions comprises sub-resolutions having a square sample aspect ratio.

In yet still another additional embodiment of the invention, the set of sub-resolutions is selected by iteratively subtracting a column width from the width of the primary resolution and multiplying the resulting width by the primary aspect ratio to determine corresponding heights and selecting the sub-resolution where the width and corresponding height are integer numbers of pixels.

In yet another embodiment of the invention, selecting the set of sub-resolutions further includes iteratively subtracting a row height from the height of the primary resolution and multiplying the resulting height by the primary aspect ratio to determine corresponding widths and selecting the sub-resolutions where the height and corresponding width are integer number of pixels.

In still another additional embodiment of the invention, the width and height for each sub-resolution in the set of sub-resolutions is a multiple of 8.

In yet still another embodiment of the invention, the set of sub-resolutions comprises sub-resolutions having a square sample aspect ratio.

In yet another additional embodiment of the invention, the set of sub-resolutions comprises sub-resolutions having a square sample aspect ratio, and the width and height for each sub-resolution is a multiple of 8.

In still another additional embodiment of the invention, the sub-resolutions for the primary resolutions of 1920×1080, 1920×1040, 1920×816, and 1920×800 are calculated.

In yet still another additional embodiment of the invention, the set of sub-resolutions comprises sub-resolutions having a common width that is repeated for a majority of the primary resolutions, and wherein a sub-resolution is selected for any primary resolution that does not share the common width value.

In yet another embodiment of the invention, the sub-resolutions selected for the primary resolutions that do not have the common width value are generated by using the width value and selecting a height value having an aspect ratio identical to the aspect ratio of the primary resolution.

In still another embodiment of the invention, the selected height values are rounded to the closest multiple of 8 pixels.

In yet still another embodiment of the invention, the selected height values is rounded down to the nearest multiple of 8.

In yet another additional embodiment of the invention, the set of sub-resolutions is selected by iteratively subtracting a row height from the height of the primary resolution and multiplying the resulting height by the primary aspect ratio to determine corresponding widths and selecting the sub-resolutions where the height and corresponding width are integer number of pixels.

Still another embodiment of the invention includes a machine readable medium containing processor instructions, where execution of the instructions by a processor causes the processor to perform a process including receiving multimedia content comprising video data having a primary resolution and a primary sample aspect ratio and encoding the video data as a set of alternative streams, where a plurality of the streams in the set of alternative streams have different maximum bitrates and resolutions, wherein the resolution of each of the plurality of streams comprises a width and height that are both an integer number of pixels and both the width and height of each of the plurality of streams is a common fraction of the width and height of the corresponding primary resolution.

In yet another additional embodiment of the invention, the numerator and denominator of the fraction are each less than 100.

Still another embodiment of the invention includes a machine readable medium containing processor instructions, where execution of the instructions by a processor causes the processor to perform a process including obtaining an index file, where the index file describes a plurality of alternative video streams having the same aspect ratio and different bitrates, resolutions and at least two of the plurality of alternative video streams have different sample aspect ratios, configuring a video decoder to decode video having a resolution, and sample aspect ratio of a first of the plurality of alternative video streams, where decoding the video comprises scaling the decoded video to the resolution of a display device, and requesting a portion of the first stream.

BRIEF DESCRIPTION OF THE DRAWINGS

FIG. 5 is a table illustrating a set of resolutions which are a common fraction of a primary resolution calculated utilizing a process in accordance with an embodiment of the invention.

FIG. 6 is a table illustrating a set of resolutions calculated for a combination of primary resolutions utilizing a process in accordance with an embodiment of the invention.

FIG. 7 is a table illustrating a final set of resolutions determined for a combination of primary resolutions utilizing a process in accordance with an embodiment of the invention.

DETAILED DESCRIPTION

Figure 1:
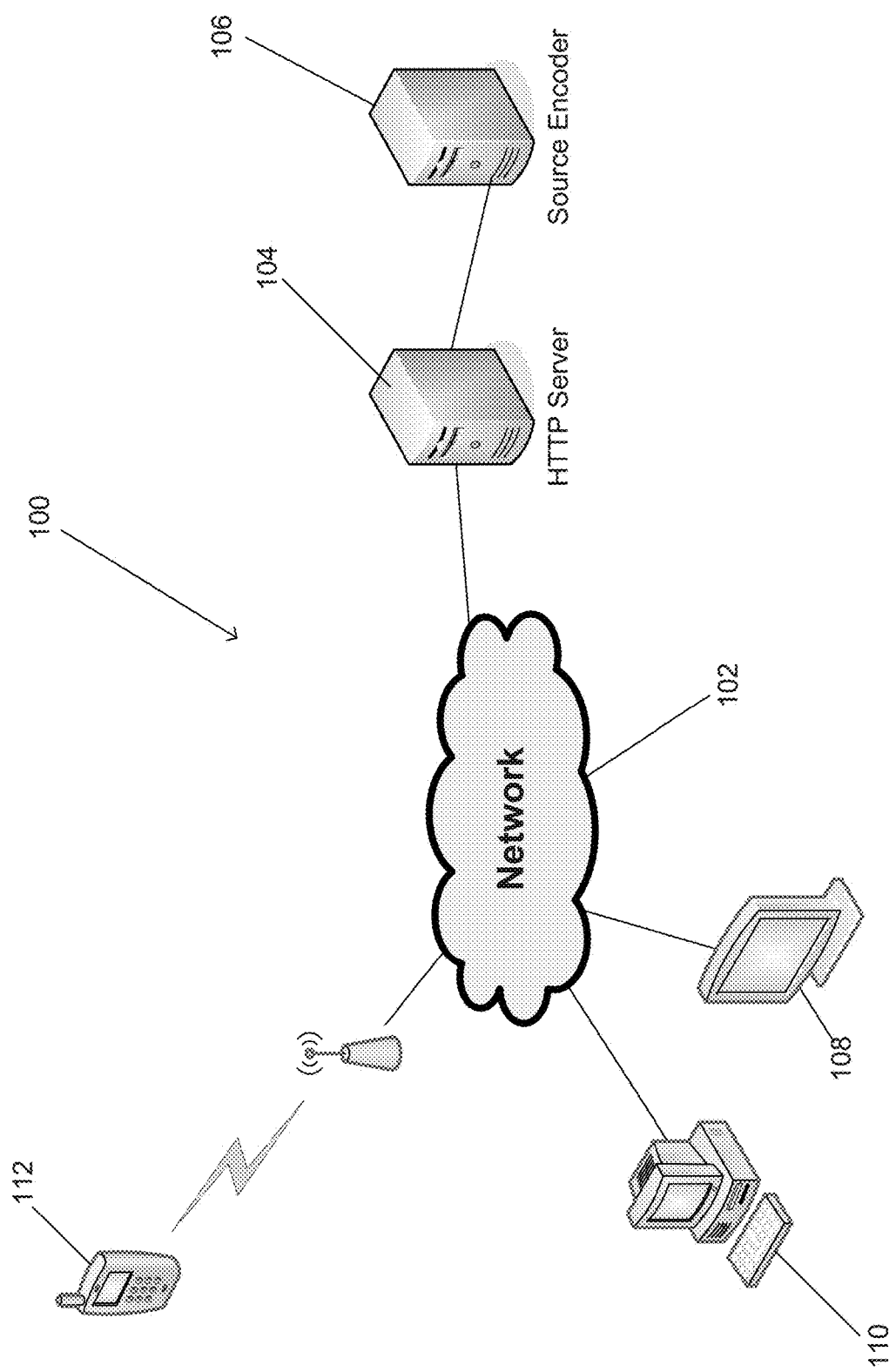
FIG. 1 is a network diagram of an adaptive bitrate streaming system in accordance with an embodiment of the invention.

Turning now to the drawings, systems and methods for adaptive bitrate streaming of streams encoded at different resolutions in accordance with embodiments of the invention are illustrated. Adaptive bitrate streaming systems in accordance with embodiments of the invention are configured to stream multimedia content encoded at different maximum bitrates and resolutions over a network, such as the Internet. Multimedia content typically includes video and audio data, subtitles, and other related metadata. Video data is created at a certain resolution and encoded to achieve a target maximum bitrate. Video data at a particular resolution can be encoded at multiple bitrates; however, the subjective quality of the video data at a particular bitrate depends in part on the resolution of the video data. For example, video data at a high resolution may have subjectively poor quality when encoded at a low bitrate due to the information stored in the high resolution video being lost in the encoding. Likewise, video data at a lower resolution may not show any improved subjective quality when encoded at gradually higher bitrates; however, the subjective quality of a lower resolution video may be acceptable at a lower bitrate relative to a higher resolution encoding. Adaptive bitrate streaming systems in accordance with embodiments of the invention contain multimedia sources containing video data of varying video resolutions and maximum bitrates. In order to provide the highest quality video experience independent of the network data rate, adaptive bitrate streaming systems are configured to switch between the available sources of video data throughout the delivery of the video data according to a variety of factors, including, but not limited to, the available network data rate, and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety.

Although streamed multimedia content can be encoded at any of a number of different resolutions, the process of decoding video for display typically involves scaling the decoded video to the resolution of the display device. Where the resolution differs from that of the display device, each pixel of the decoded video is scaled to correspond to one or more pixels of the display. In some cases, it may be preferable that the scaling ratio between the streamed multimedia content and the display resolution be a whole-number fraction, such as 1:2, 2:3, 3:4, 7:8, etc. Adaptive bitrate streaming systems are designed to transition between streams in response to changes in streaming conditions. Transitions between streams encoded at resolutions that are scaled by different ratios for display are often visibly disruptive. In a number of embodiments, the adaptive bitrate streaming system is configured so that content is encoded in such a way that each stream of video is encoded with an identical aspect ratio that is the same as the aspect ratio of the source video. In this way, each pixel of the encoded video scales in a uniform fashion when decoded and displayed on a display device receiving the video. Adaptive bitrate streaming systems configured to stream video encoded at multiple resolutions with the same aspect ratio as the source video in accordance with embodiments of the invention are discussed further below.

System Overview

An adaptive bitrate streaming system in accordance with an embodiment of the invention is illustrated in FIG. 1. The adaptive bitrate streaming system 100 includes a source encoder 106 configured to encode source media as a number of alternative streams each having the same aspect ratio. In the illustrated embodiment, the source encoder is a server. In other embodiments, the source encoder can be any processing device including a processor and sufficient resources to perform the transcoding of source media (including but not limited to video, audio, and/or subtitles). The source encoding server 106 typically generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. However, the alternative video streams are encoded with the same aspect ratio corresponding to the aspect ratio of the source video. The top level index file and the container files are uploaded to an HTTP server 104. Although the source encoding server 106 is described above as generating the top level index file, in many embodiments the top level index file is dynamically generated in response to a request for a specific piece of content by a playback device.

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In an adaptive bitrate streaming system that utilizes streams encoded at different resolutions, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams at a lower resolution utilizing less bandwidth and resulting in the playback device transitioning to a phase in which the playback device assumes unstable operating conditions, buffers less content, and responds rapidly to variations in streaming conditions.

Figure 4:
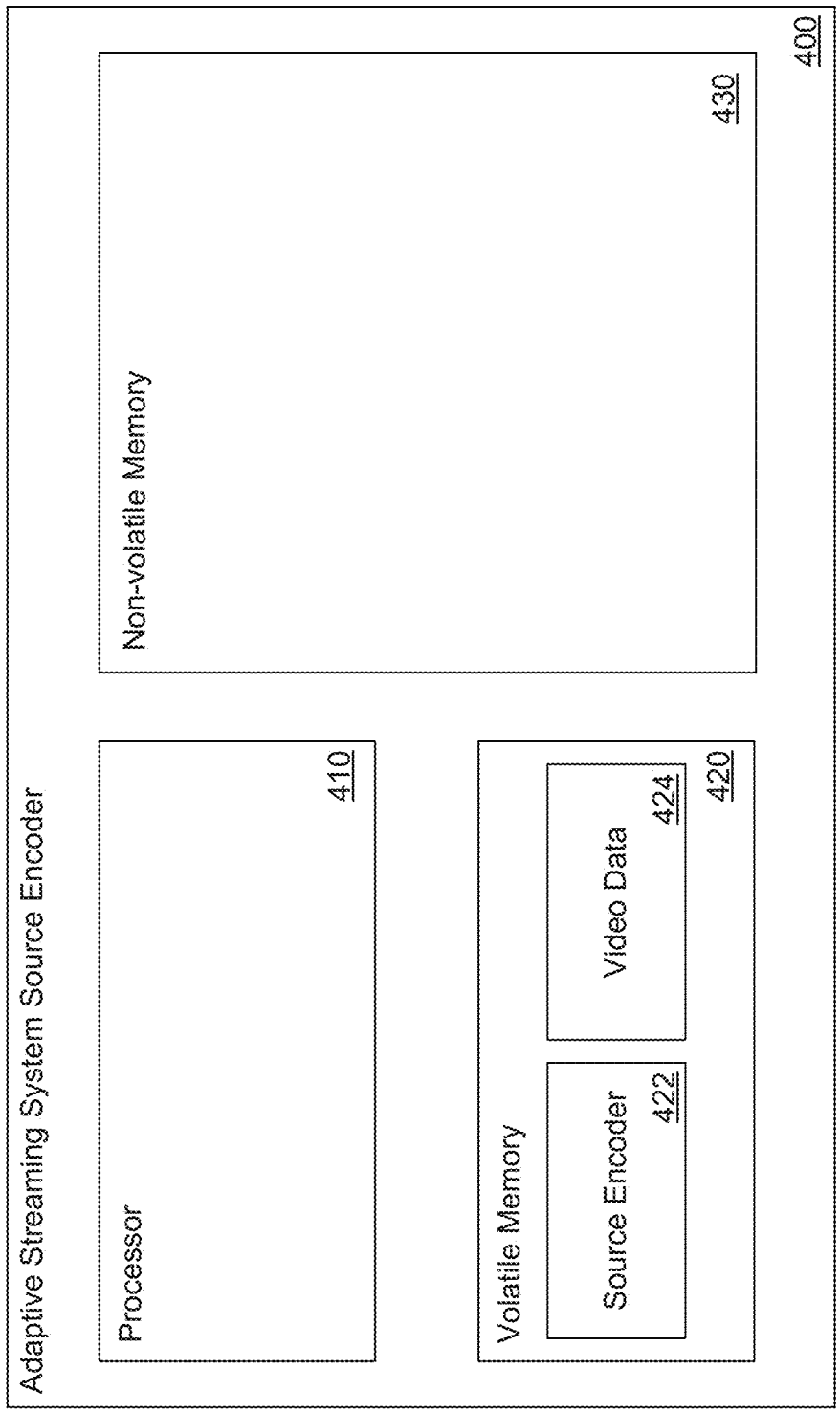
FIG. 4 conceptually illustrates a playback device configured to deliver video data encoded utilizing different video resolutions in accordance with an embodiment of the invention.

In the illustrated embodiment, the adaptive bitrate streaming system includes computer systems capable of delivering multimedia content with variable data rates utilizing a variety of video resolutions. In many embodiments, adaptive bitrate streaming systems can be implemented using any device capable of delivering encoded streams of multimedia, where the streams are encoded at different maximum bitrates and resolutions. The basic architecture of an adaptive streaming system source encoder in accordance with an embodiment of the invention is illustrated in FIG. 4. The adaptive bitrate streaming system 400 includes a processor 410 in communication with non-volatile memory 430 and volatile memory 420. In the illustrated embodiment, the volatile memory includes a source encoder 422 and alternative streams of video data 424 encoding at different resolutions. Although a specific architecture is illustrated in FIG. 4, any of a variety of architectures including architectures where the application is located on disk or some other form of storage and is loaded into volatile memory at runtime can be utilized to implement adaptive bitrate streaming systems capable of multimedia delivery applications with variable data rates utilizing different video resolutions in accordance with embodiments of the invention. Furthermore, any of a variety of system architectures including (but not limited) to the system architecture illustrated in FIG. 1 can be utilized to perform video delivery in accordance with embodiments of the invention. Systems and methods for encoding streams of video data at different resolutions and delivering the encoded video data utilizing adaptive streaming in accordance with embodiments of the invention are discussed further below.

Selection of Resolutions for a Primary Resolution

Figure 2:
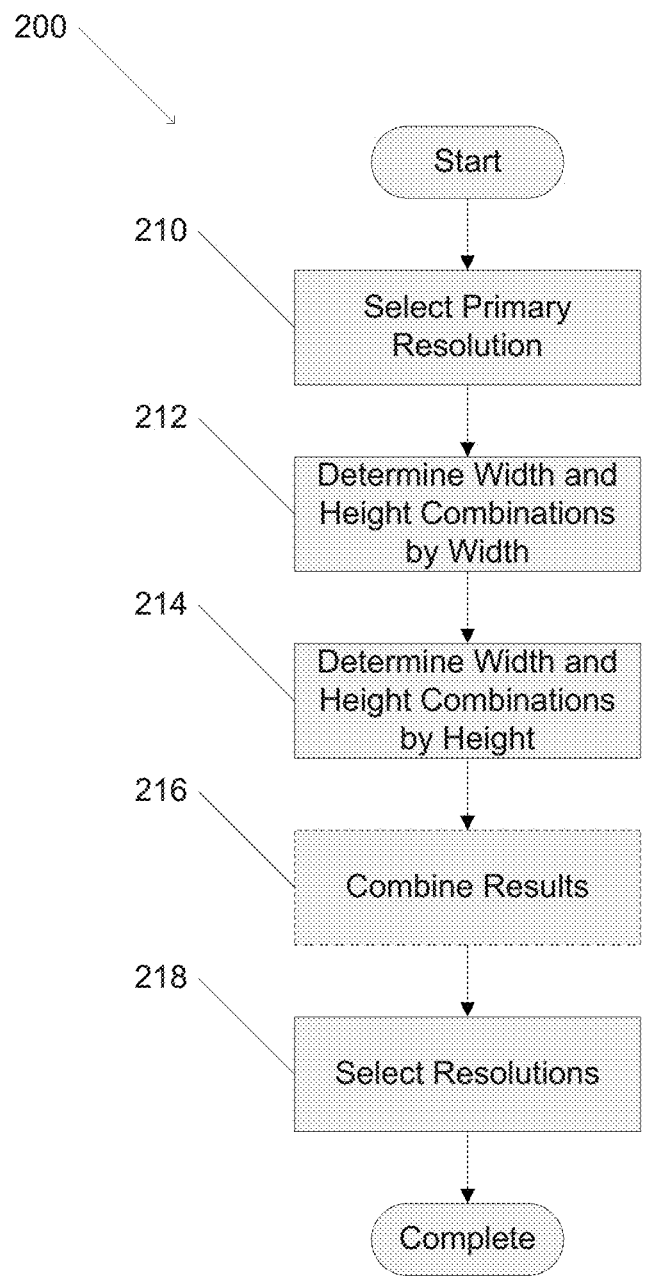
FIG. 2 is a flow chart illustrating a process for selecting resolutions given a primary resolution in accordance with an embodiment of the invention.

As discussed above, adaptive bitrate streaming systems involve switching between different video streams encoded at different bitrates depending on streaming conditions. In an adaptive streaming system that utilizes alternative video streams encoded at different resolutions, the resolution of each stream can be selected based upon the playback quality of the encoded video at a given bitrate. A generalized process for selecting resolutions for a video stream in accordance with embodiments of the invention is illustrated in FIG. 2. The process 200 commences by selecting (210) a primary resolution based on a given aspect ratio. For example, for an aspect ratio of 16:9, in many embodiments of the invention the primary resolution is 1920×1080 pixels. To determine 212 all height and width combinations by width, the width of the primary resolution may be reduced by one line at a time and the corresponding height calculated by applying the aspect ratio to the new width. In several embodiments, the width of the image must be a multiple of 8 pixels. In a number of embodiments, the calculated height may be rounded to the nearest integer value. In many embodiments, the determination (212) of height and width combinations is repeated until the width reaches a predetermined minimum width, such as 320 pixels. To determine (214) the width and height combinations of the primary resolution, an identical process can be utilized as above with the height. As before, in several embodiments the height is a multiple of 8 pixels high. Although, in other embodiments the final image widths and heights can be defined as any multiple of a number of pixels, such as a multiple of 2 or 4 pixels.

Once the set of resolutions is determined using both width and height, the lists are combined (216) and any duplicate width and heights removed. Once the duplicate resolutions are removed, the calculated width and heights are compared to the primary width and height to determine which resolutions are selected (218). In many embodiments of the invention, those calculated resolutions where both the height and width can be represented as whole-number fractions of the height and width of the primary resolution are selected (218), where the numerator or the denominator are less than a predetermined number such as 100. One example of a set 500 of resolutions and ratios calculated in accordance with an embodiment of the invention utilizing the process described above are shown in FIG. 5. For example, one width and height combination is 1280×720, with a width ratio of 2/3 and a height ratio of 2/3 to the primary resolution 1920×1080. In many embodiments, 1280×720 would be selected (218) as a sub-resolution for the primary resolution of 1920×1080. However, a resolution such as 1888×1062 would not be selected, because neither 1888 divided by 1920 or 1062 divided by 1080 can be represented using whole-number fractions where both the numerator and denominator are each less than 100. In other embodiments, the whole-number fractions may both be less than 10, or 1000, or the numerator may be less than 10 and denominator less than 1000 and vise-versa.

Although a specific process for selecting resolutions for use in a multiple resolution adaptive streaming system is discussed above, any of a variety of processes that involve calculating resolutions based on a primary resolution, including those where resolutions higher than the primary resolution are calculated, can be utilized in accordance with embodiments of the invention. Systems and methods for selecting resolutions given a combination of primary resolutions are discussed further below.

Selection of Resolutions for a Combination of Primary Resolutions

Figure 3:
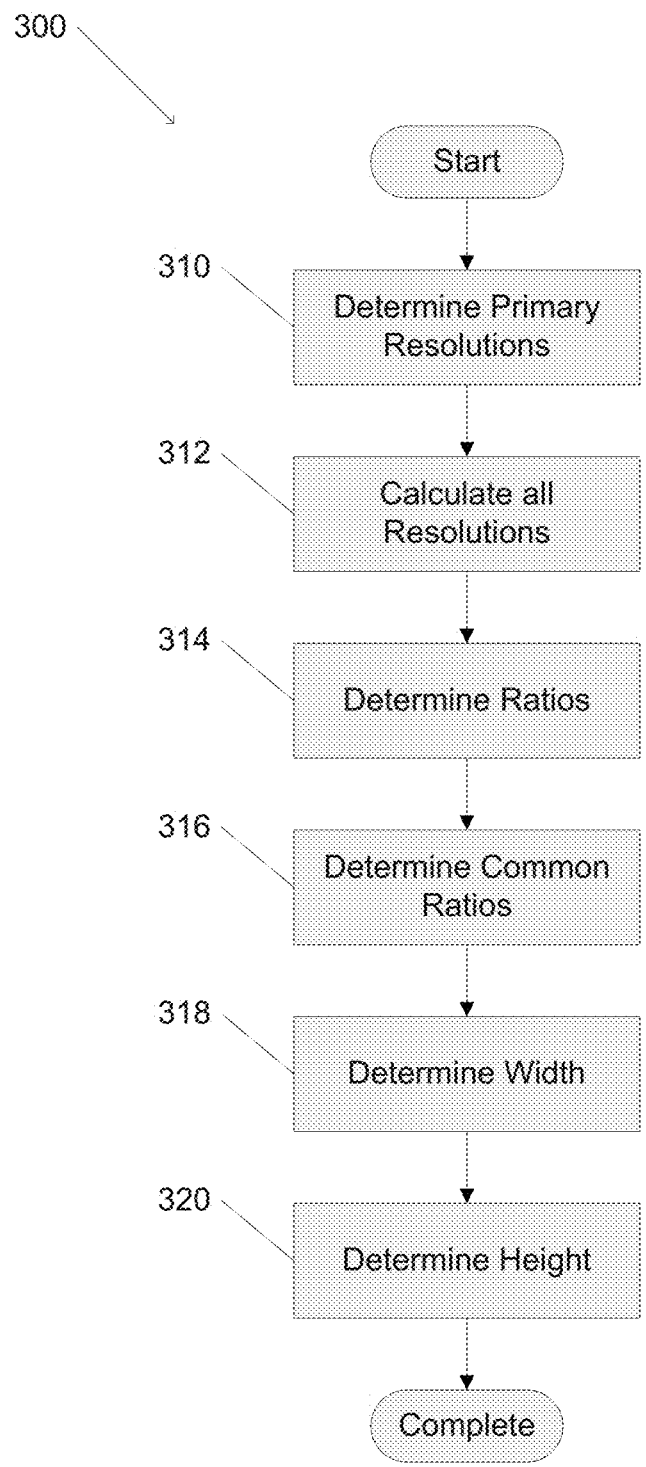
FIG. 3 is a flow chart illustrating a process for selecting resolutions given a combination of primary resolutions in accordance with an embodiment of the invention.

Video data contained in multimedia content is often created at a particular resolution and aspect ratio. However, it is desirable to display multimedia content on a variety of display devices; these display devices may not be of the same resolution or aspect ratio as the video data. In an adaptive streaming system, the video data may be encoded at a variety of primary resolutions with differing aspect ratios in order to maintain a level of consistency in the display of the source multimedia content. A generalized process for selecting resolutions for a video stream with multiple aspect ratios in accordance with embodiments of the invention is illustrated in FIG. 3. The process 300 commences by determining (310) the set of primary resolutions for a variety of aspect ratios. For example, in many embodiments, the primary resolutions (with accompanying aspect ratio) may be 1920×1080 (16:9), 1920×1040 (1.85:1), 1920×816 (2.35:1), and 1920×800 (2.4:1). For each primary resolution, resolutions are calculated (312) and the ratio of the calculated resolution to the primary resolution is determined (314). In many embodiments of the invention, the process described above may be utilized to determine the calculated resolutions and ratios for each primary resolution. In several embodiments, determining the ratio (314) involves converting the ratio to a percentage expressing the percentage area that the calculated resolution contains relative to the primary resolution is rounded to a predetermined number of significant digits, such as 1 significant digit. The common ratios between the calculated resolutions of the primary resolutions are then selected (316). In many embodiments, the common ratios selected (316) will be common to all primary resolutions. In several embodiments, the common ratios selected (316) will be common to a majority of primary resolutions, such as three out of four primary resolutions, three out of five primary resolutions, or two out of three primary resolutions. Once the common ratios are selected, the corresponding width is determined (318). For the primary resolutions that do not have a matching ratio, the nearest width may be selected. In a number of embodiments, the nearest width should be a multiple of 4. In many embodiments, the nearest width should be a multiple of 8. Based on the width, the corresponding height is determined (320) utilizing the aspect ratio.

An example set 600 of resolutions calculated in accordance with an embodiment of the invention is shown in FIG. 6. Given the primary resolutions and aspect ratios as shown in FIG. 6, one common ratio determined (314) is 64%, occurring in three of the four primary resolutions. The calculated resolutions (with aspect ratio) based on the primary resolutions are 1536×864 (16:9), 1536×832 (1.85:1), and 1536×640 (2.4:1). The 2.35:1 aspect ratio does not have a calculated resolution, which is 1536 pixels wide; the nearest height which corresponds to the same ratio of the width to height as the primary resolution is 652.8. In some embodiments, this resolution may be rounded to the nearest value that is a multiple of 8, or 656. Some other embodiments may use the closest multiple of 8 that is smaller than the calculated height value, or 648. Accordingly, the calculated height is 656 and resolution 1536×656 may be utilized as the calculated resolution. An example of calculated resolutions using the rounding method, given the primary resolutions of 1920×1080, 1920×1040, 1920×816, and 1920×800 with resolutions targets at the aspect ratios 16:9, 1.85:1, 2.35:1, and 2.4:1, are illustrated in FIG. 7. The table 700 shows the common WidthRatio*HeightRatios, the number of occurrences of each WidthRatio*HeightRatio, the corresponding width, and the calculated height for each aspect ratio which is a multiple of 8, where the calculated heights have been signified using an underline. In a number of embodiments of the invention, a source encoder receives video data with a resolution of 1920×1080 and encodes the video data in multiple streams at the resolutions shown in FIG. 7.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A source encoder including a processor and a memory readable by the processor where the memory stores an encoding application that directs the processor to receive a primary video stream and to encode the primary video stream into a set of alternative video streams, where the encoding application is characterized by:
   select a primary resolution based on a given aspect ratio of the primary video stream;
   determine a plurality of height and width combinations for the given aspect ratio from the primary resolution wherein each of the plurality of combinations is derived by:
      selecting a first value for a first one of a height or width of a height and width combination,
      applying the aspect ratio of the primary stream to the first value, and
      rounding a result of the application of the aspect ratio to a nearest integer to determine a second value for a second one of the height and width of a height and width combination,
      where the height and width of each combination is an integer number of pixels and is less than the corresponding width and height of the primary resolution and the width and height of the selected combinations have substantially the same aspect ratio as the primary aspect ratio;
   determine whether the height and the width of each height and width combination of the plurality of height and width combinations are each whole number fractions of the height and the width of the primary resolution;
   select a set of resolutions for the set of alternative video streams from the plurality of height and width combinations by:
      determining a plurality of height and width combinations for each of a plurality of alternative aspect ratios, wherein a height and a width for each height and width combination of the plurality of height and width combinations for each of the plurality of alternative aspect ratios of a corresponding height and width combination are both determined to be whole number fractions of the alternative aspect ratio; and
      selecting a set of common height and width combinations from the plurality of height and width combinations for the alternative aspect ratios, wherein:
         each height and width combination of the set of common height and width combinations has a same particular width; and
         the set of common height and width combinations are selected based on a number of alternative aspect ratios at which the plurality of height and width combinations for the alternative aspect ratio comprises a height and width combination with a given width; and
   encode a set of alternative video streams from the primary video stream, where each of the alternative video streams is encoded at a different resolution from the set of resolutions and a different bitrate from other video streams in the set of alternative video streams.

2. The source encoder of claim 1 wherein the first value is a width in pixels and the encoder application directs the processor to select the first value for the width by: subtracting a single pixel from a previous width to select the first value for the width.

3. The source encoder of claim 1 wherein the first value is a height in pixels and the encoder application directs the processor to select the first value for the height by: subtracting a single pixel from a previous height to select the first value for the height.

4. The source encoder of claim 1 wherein the selected set of resolutions includes each height and width combination from the plurality of height and width combinations that have a height and a width that is a multiple of 8.

5. The source encoder of claim 1 wherein the set of resolutions selected comprises height and width combinations having a square sample aspect ratio.

6. The source encoder of claim 1, wherein the encoder application directs the processor to determine whether the height and the width of each height and width combination of the plurality of height and width combinations are each whole number fractions of the height and the width of the primary resolution by determining whether a numerator and a denominator of the whole number fraction are below a given threshold.

7. A method performed by a set of one or more encoding servers of a content distribution system to encode a primary video stream into a set of alternative video streams that are each stored in separate container files comprising a plurality of alternative video streams each having a frame rate and a bitrate, and an audio stream, the method comprising:

selecting a primary resolution based on a given aspect ratio of the primary video stream;

determining a plurality of height and width combinations for the given aspect ratio based upon the primary resolution and the given aspect ratio wherein each of the plurality of combinations is derived by:
  selecting a first value for a first one of a height or width for a height and width combination,
  applying the aspect ratio of the primary stream to the first value, and
  rounding a result of the application of the aspect ratio to a nearest integer to determine a second value for a second one of the height and width of athe height and width combination,
  where the height and width of each combination is an integer number of pixels and is less than the corresponding width and height of the primary resolution and the width and height of the selected combinations have substantially the same aspect ratio as the primary aspect ratio;

determining whether the height and the width of each height and width combination of the plurality of height and width combinations are each whole number fractions of the height and the width of the primary resolution;

selecting a set of resolutions for the set of alternative video streams from the plurality of height and width combinations by:
  determining a plurality of height and width combinations for each of a plurality of alternative aspect ratios, wherein a height and a width for each height and width combination of the plurality of height and width combinations for each of the plurality of alternative aspect ratios of a corresponding height and width combination are both determined to be whole number fractions of the alternative aspect ratio; and
  selecting a set of common height and width combinations from the plurality of height and width combinations for the alternative aspect ratios, wherein:
    each height and width combination of the set of common height and width combinations has a same particular width; and
    the set of common height and width combinations are selected based on a number of alternative aspect ratios at which the plurality of height and width combinations for the alternative aspect ratio comprises a height and width combination with a given width; and encoding a set of alternative video streams from the primary video streams where each of the alternative video streams is encoded at a different resolution from the set of resolutions and a different bitrate from other video streams in the set of alternative video streams.

8. The method of claim 7 wherein the first value is a width in pixels and selecting the first value for the width comprises: subtracting a single pixel from a previous width to select the first value for the width.

9. The method of claim 7 wherein the first value is a height in pixels and selecting the first value for the height comprises: subtracting a single pixel from a previous height to select the first value for the height.

10. The method of claim 7 wherein the selected set of resolutions includes each height and width combination from the plurality of height and width combinations that have a height and a width that is a multiple of 8.

11. The method of claim 7 wherein the set of resolutions selected comprises height and width combinations having a square sample aspect ratio.

12. The method of claim 7, wherein determining whether the height and the width of each height and width combination of the plurality of height and width combinations are each whole number fractions of the height and the width of the primary resolution comprises determining whether a numerator and a denominator of the whole number fraction are below a given threshold.

* * * * *